United States Patent
Miller et al.

(10) Patent No.: US 6,272,268 B1
(45) Date of Patent: Aug. 7, 2001

(54) OPTICAL COUPLERS WITH MULTILAYER FIBERS

(75) Inventors: William J. Miller, Horseheads; David L. Weidman, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/331,711

(22) PCT Filed: Dec. 8, 1997

(86) PCT No.: PCT/US97/23056

§ 371 Date: Jun. 23, 1999

§ 102(e) Date: Jun. 23, 1999

(87) PCT Pub. No.: WO98/29768

PCT Pub. Date: Jul. 9, 1998

Related U.S. Application Data
(60) Provisional application No. 60/034,234, filed on Dec. 31, 1996.

(51) Int. Cl.[7] .................................................. G02B 6/26
(52) U.S. Cl. .............................. 385/43; 385/28; 385/30; 385/39; 385/126
(58) Field of Search ................... 385/24, 27, 28, 385/30, 39, 43, 126, 144; 359/341, 345

(56) References Cited

U.S. PATENT DOCUMENTS

| | | | |
|---|---|---|---|
| 4,673,270 | 6/1987 | Gordon | 350/96.15 |
| 4,798,436 | 1/1989 | Mortimore | 350/96.15 |
| 4,976,512 | 12/1990 | Safaai-Jazi | 350/96.33 |
| 5,011,251 | 4/1991 | Miller et al. | 350/96.15 |
| 5,044,716 | 9/1991 | Berkey | 385/51 |
| 5,129,020 | 7/1992 | Shigematsu et al. | 385/43 |
| 5,179,603 | 1/1993 | Hall et al. | 385/24 |
| 5,268,979 | 12/1993 | Weidman | 385/42 |
| 5,295,210 | * 3/1994 | Nolan et al. | 385/43 |
| 5,295,211 | 3/1994 | Weidman | 385/43 |
| 5,339,372 | 8/1994 | Miller et al. | 385/29 |
| 5,412,745 | 5/1995 | Weidman et al. | 385/43 |
| 5,754,720 | * 5/1998 | Quinn et al. | 385/43 |

OTHER PUBLICATIONS

Parriaux et al., "Wavelength Selective Distributed Coupling Between Signle Mode Optical Fibers for Multiplexing", J. of Optical Communications 2 (1981) 3, 105–109.

* cited by examiner

Primary Examiner—Frank G. Font
Assistant Examiner—Michael P Mooney
(74) Attorney, Agent, or Firm—Eric M. Smith; Daniel P. Malley

(57) ABSTRACT

A tapered optical fiber coupler includes a first fiber with a core (11) and a cladding (12) and a second fiber with a core (21), an inner cladding (22) and an outer cladding (23). In the stretched, coupling regions of the device, the coupling regions (44, 50) of the fibers form of coupling region waveguides with dispersion curves crossing one another at a preselected operating wavelength. The one or more claddings of each fiber has a monotonic decreasing refractive index distribution, and the refractive index distributions of the claddings (12, 22, 23) are different from one another. Coupling of light from one another occurs only in the narrow band of wavelengths surrounding the operating wavelengths. The outside diameters and core diameters of the fibers may be identical to one another and identical to those of standard optical fibers. Thus, the device can be connected in an optical system.

19 Claims, 9 Drawing Sheets

OPTICAL COUPLERS WITH MULTILAYER FIBERS

This application claims benefit to Provisional Application Ser. No. 60/034,234 filed Dec. 31, 1996.

BACKGROUND OF THE INVENTION

The present invention relates to optical fiber couplers. Devices referred to as "couplers" are commonly used in fiber optic communications systems to transfer light from one fiber to another. Optical fibers typically include a core and a cladding surrounding the core. Although light is commonly regarded as traveling within the core of a single-mode fiber, a so-called "evanescent field" spreads into the cladding.

One type of evanescent coupler, commonly referred to as an "overclad tapered" coupler, utilizes fibers which have been stretched at preselected coupling regions. The coupling regions are surrounded by a common matrix, referred to as an "overcladding". The core and cladding of each fiber taper gradually, on both sides of the coupling region, from the full diameter in unstretched regions of the fiber down to minimum diameters within the coupling region. The diameters of the claddings within the coupling regions are comparable to the diameters of the cores outside the coupling regions. Light transmitted along one of the fibers passes through the coupling region of the fiber principally by way of the narrowed cladding. As a useful first approximation, the narrowed claddings can be considered as forming the cores of further coupling-region optical waveguides, and the overcladding can be thought of as forming the claddings of each such coupling-region waveguides. Light passing along one such coupling-region waveguide will have an evanescent field extending to the coupling-region waveguide of the other fiber. Light transfers from one such waveguide to the other, and thus transfers from fiber to fiber within the coupling regions. As disclosed in commonly assigned U.S. Pat. Nos. 4,931,076 and 5,011,251, overclad tapered couplers can be manufactured by a process in which the two fibers are enveloped in a tube of the overcladding material; the tube is heated and collapsed onto the fibers; and the entire assembly is pulled to stretch the fibers and form the coupling regions.

"Fused-fiber" couplers can be made by fusing two fibers and then tapering them. Fused-fiber couplers function in a manner similar to that described above with respect to overclad couplers. When the fiber cladding diameter becomes sufficiently small, the composite of the core and cladding functions as the light guiding portion of the waveguide in the coupling region, and the surrounding air functions as the cladding. Light power propagating in the first fiber couples to the coupling-region waveguide (the narrowed cladding of the first fiber). The evanescent mode field of light traveling in the first fiber expands in the fused tapered coupling-region waveguide of the first fiber so that it couples to the fused tapered coupling-region waveguide of the second fiber.

The principles of the present invention can be employed in conjunction with both fused fiber couplers and overclad couplers.

The amount of power transferred from one fiber to another in an evanescent coupler depends upon factors including the wavelength of the light, the length along which coupling occurs, commonly called the "coupling length", and the difference between the propagation constants of the light paths in the regions where coupling occurs. The "propagation constant" is a measure of the speed of propagation of the light along a path. The propagation constant is commonly denoted by the symbol $\beta$, whereas the difference in propagation constants within the coupling regions of an evanescent coupler is commonly denoted by $\Delta\beta$. As discussed in greater detail below, the propagation constant of light passing through an optical waveguide depends upon the diameter of the core; the indices of refraction of the core and cladding, and the wavelength of the light.

Where the light paths of a coupler are formed from identical fibers, $\Delta\beta$ is zero. In this case, complete (100%) coupling of the optical power from one light path to the other is possible. Commonly assigned U.S. Pat. No. 5,011,251 teaches an achromatic overclad tapered coupler with light paths made from different fibers. One fiber is a standard fiber having a core of high refractive index and a cladding of lower refractive index. In certain embodiments, the other fiber may be a three-layer structure including a core of high refractive index, an outer cladding of low refractive index and a thin inner cladding having a refractive index lower than that of the outer cladding disposed between the core and the outer cladding. In this structure, $\Delta\beta$ is not zero. Complete optical power transfer is not possible. This phenomena is utilized in couplers made in accordance with U.S. Pat. No. 5,011,251 to provide couplers that divert a substantially constant preselected portion of the light from one optical fiber to another over a relatively wide range of wavelengths.

Other couplers are designed to provide wavelength-selective performance. For example, in a wavelength division multiplexing transmission scheme, a single fiber may carry light at several slightly different wavelengths. Each wavelength carries a separate stream of information. A wavelength selective device can be used at a point where the fiber branches to direct one wavelength onto one branch of the fiber and to direct the other wavelengths onto the other branch. Several transmitters and/or receivers belonging to different telecommunications customers can be connected to a single main fiber by wavelength-selective couplers. Each coupler is adapted to couple only a narrow band of wavelengths between the main fiber and a spur fiber leading to the particular transmitter or receiver while leaving all other wavelengths on the main fiber. Signals intended for the particular customer are sent at the wavelength associated with that customer.

A wavelength-selective coupler can be made by using two different fibers. Properties such as fiber diameter and refractive index profile are selected for each fiber so that the dispersion in the two fibers differs. "Dispersion" is the variation in $\beta$ with wavelength. Thus, one fiber has $\beta$ which varies rapidly with wavelength (high dispersion), whereas the other fiber has $\beta$ which varies only gradually with wavelength (low dispersion). The properties of the fibers are selected so that both fibers have the same $\beta$ for light at or near a desired operating wavelength. In this case, $\Delta\beta$ has a large value at all wavelengths except within a narrow passband around the operating wavelength. This tends to suppress coupling at wavelengths outside of the passband, so that only light within the passband is coupled from one fiber to the other.

If cladding diameter is one of the fiber differences that is employed to achieve the desired $\Delta\beta$, the different claddings will form coupling-region waveguides of different diameters when the fibers are stretched. However, this approach implies that at least one fiber will have a cladding diameter different from the standard cladding diameter commonly used for fibers in communications systems. This leads to significant practical difficulties in connecting the non-standard fiber to other fibers in the system.

U.S. Pat. No. 4,976,512 teaches a fused-fiber coupler incorporating a standard step-index fiber and a "W-index" fiber to achieve narrowband coupling between two fibers. The W-index fiber of U.S. Pat. No. 4,976,512, like the three-layer fiber of the aforementioned U.S. Pat. No. 5,011,251, includes a core of high refractive index, an outer cladding of low refractive index and an inner cladding having refractive index lower than that of the outer cladding. In the '512 patent, however, the inner cladding has an appreciable thickness and substantially influences the dispersion characteristics of the fiber, so as to provide a steeply-sloping dispersion curve. However, optical fibers having depressed index cladding regions surrounding the core, such as the depressed index region of the W-index fiber of the '512 patent, experience significant loss of optical power in the tapered regions of the fiber due to non-adiabatic mode coupling.

It is therefore an object of the invention to provide a narrow band fiber optic coupler that exhibits low excess loss.

SUMMARY OF THE INVENTION

One aspect of the present invention provides a tapered coupler having at least a first fiber and a second fiber. The first fiber has a first-fiber and a first-fiber cladding surrounding the core. The second fiber includes at least three layers: a core, an inner cladding surrounding the core and an outer cladding surrounding the inner cladding. Each fiber includes end regions and a tapered coupling region disposed between the end regions. In the end regions, each fiber has its normal, full diameter. In the tapered coupling regions, the cores and claddings of the fibers have diameters smaller than the diameters of the corresponding elements in the end regions. The tapered coupling regions extend side-by-side adjacent one another. The coupling regions of the fibers are disposed in a surrounding medium such as air, glass or the like.

In a coupler according to the present invention, the second fiber has a monotonic refractive index distribution. That is, the refractive index at any location within the fiber is always the same as, or lower than, the refractive index at a location closer to the center of the fiber. The refractive index $n_{22}$ of the inner cladding is less than the maximum refractive index $n_{21}$ of the core, whereas the refractive index $n_{23}$ of the outer cladding is less than $n_{22}$. The first fiber preferably has a monotonic refractive index distribution, decreasing from the center of the fiber to the periphery of the fiber, and it may be a standard step-index or gradient-index fiber having a maximum core refractive index $n_{11}$ and a cladding refractive index $n_{12}$. The refractive index $n_{30}$ of the medium surrounding the coupling region is equal to or less than $n_{23}$. Moreover, in accordance with the present invention, $n_{22}$ is greater than $n_{12}$, and $n_{12}$ is greater than $n_{23}$.

In a particularly preferred arrangement, the inner cladding of the second fiber has a diameter, within the coupling region, less than the diameter of the cladding of the first fiber. The diameter of the inner cladding in the second fiber in the end regions may be less than the diameter of the first fiber cladding in the end regions as well. Most preferably, the diameter of the outer cladding of the second fiber in the end regions is substantially equal to the diameter of the first-fiber cladding. The outside diameters of both fibers may be equal to the outside diameters of standard telecommunications fibers. Also, the core diameters of both fibers, in the end regions thereof, may be equal to one another and equal to the core diameters of standard telecommunications fibers. These features facilitate connection to other fibers in the system and minimize losses in the system. Most preferably, the refractive index $n_{30}$ is the lowest refractive index in any of the components. The surrounding medium index should be less than the refractive index of the first-fiber cladding. As a useful first approximation, light passing through the tapered coupling regions of the first fiber can be considered as passing through a first waveguide constituted by the narrowed cladding of the first fiber, serving as a core, surrounded by the surrounding medium acting as the cladding of the waveguide. The light passing through the second fiber can be considered as passing through a second waveguide constituted by the inner cladding of the second fiber, acting as a core, surrounded by composite "cladding" constituted by the narrow outer cladding of the fiber and the surrounding minimum material. Typically, where the outer cladding of the second fiber has a refractive index close to that of the surrounding medium, the composite cladding has essentially the same properties as the surrounding medium itself. Thus, the juxtaposed coupling regions of the fibers and the surrounding medium form an evanescent coupler with waveguides of different core diameters.

Filters according to the invention can be tuned by bending the surrounding medium and the coupling regions of the fibers. Bending in one direction, in the plane of the side-by-side fibers, shifts the operating wavelength upwardly, whereas bending in the opposite direction lowers the operating wavelength.

A further aspect of the invention provides an overclad coupler having first and second fibers, each said fiber having a pair of end regions and a tapered coupling region disposed between said end regions, said coupling regions extending side-by-side adjacent one another. The coupler includes an surrounding medium surrounding the coupling regions. The first and second fibers most preferably have the same outside diameter in their end regions. The first and second fibers each have a core and one or more claddings. The cladding or claddings of each fiber have monotonic decreasing refractive index distributions. That is, the refractive index either remains constant or decreases with distance from the center of the fiber; it does not increase with distance from the center of the fiber at any location in the claddings. The refractive index distributions of the claddings are different from one another. Most preferably, the refractive index distribution of the claddings in a first fiber has a small average rate of change with distance from the fiber center, as, for example, the constant (zero slope) refractive index distribution provided by the single cladding layer of the first fiber discussed above. The refractive index distribution of the second fiber claddings desirably has a larger average rate of change in refractive index with distance from the center of the fiber. Preferably, the refractive index of the second-fiber cladding at the boundary with the core is higher than the refractive index of the first-fiber cladding at its boundary with the core. The multilayer claddings of the second fiber discussed above meet these conditions.

As further discussed below, this arrangement provides the coupling region waveguide formed by the second fiber with different dispersion characteristics than the waveguide formed by the coupling region of the first fiber. These differing dispersion characteristics intersect at the desired operating wavelength. At the operating wavelength, $\beta$ is approximately equal for both waveguides. At other wavelengths, $\beta$ for one waveguide is substantially different than $\beta$ for the other waveguide. The different dispersion characteristics of the two waveguides greatly enhance selectivity of the coupler as discussed below, so that substantial coupling occurs only in a narrow passband around the operating wavelength. Preferably, the coupling length is selected so that coupling is at or near a local maximum at the operating wavelength. As discussed below, such a structure provides an effective, narrow band wavelength selective filter which will selectively divert light at the operating wavelength from one fiber to another and which will allow light at other wavelengths to pass through the structure on the same fiber from which it entered.

DETAILED DESCRIPTION OF THE PREFERRED EMBODIMENTS

Figure 1:
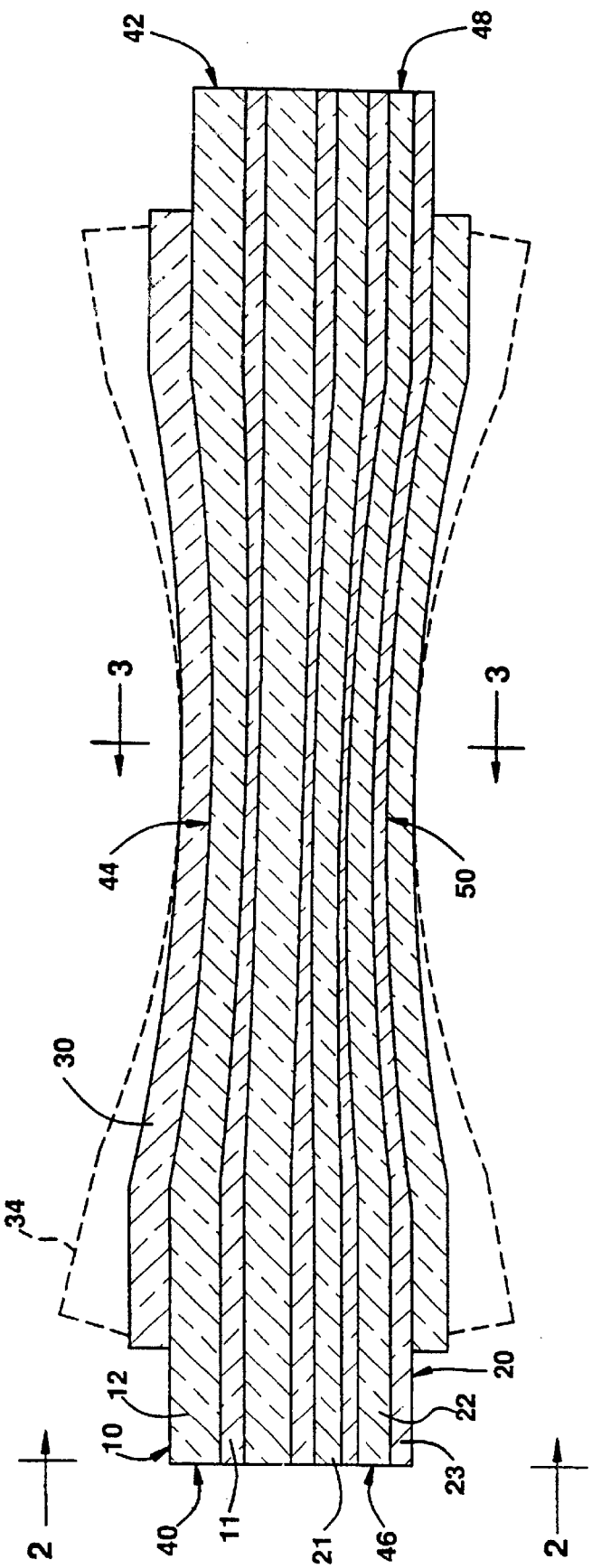
FIG. 1 is a diagrammatic sectional view depicting a coupler in accordance with one embodiment of the present invention.
Figure 2:
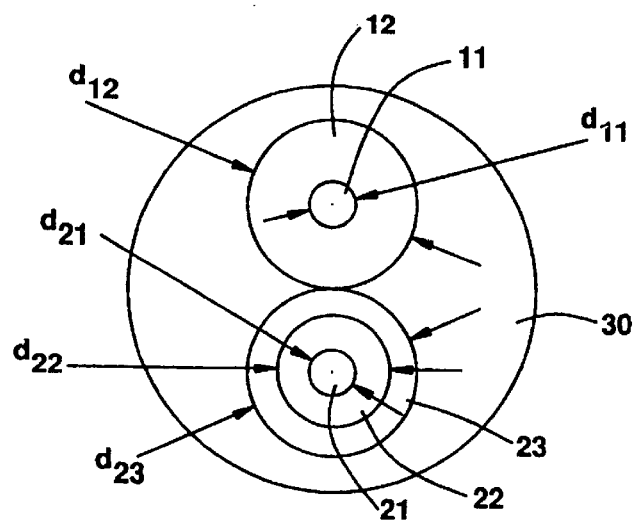
FIG. 2 is a diagrammatic elevational view along line 2—2 in FIG. 1.
Figure 3:
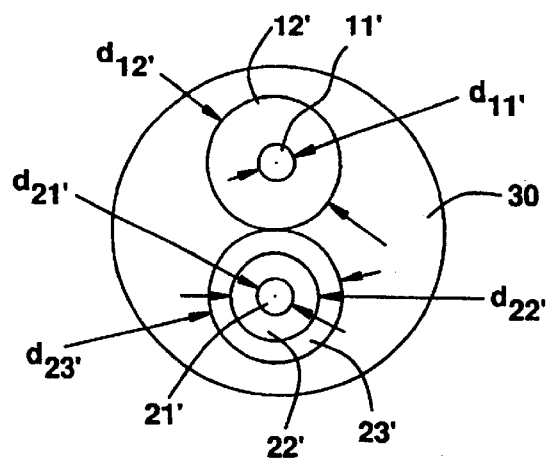
FIG. 3 is a diagrammatic sectional view taken along line 3—3 in FIG. 1.

A coupler in accordance with the embodiment of FIG. 1 includes a first fiber 10 having a first end region 40, a second end region 42 and a tapered coupling region 44 disposed between these end regions. Fiber 10 is a conventional step-index fiber incorporating a core 11 of refractive index $n_{11}$ and a cladding 12 of refractive index $n_{12}$ surrounding the core. In the end regions 40 and 42, where the fiber has its full, unstretched or undeformed diameter, the core and cladding have outside diameters $d_{11}$ and $d_{12}$, respectively (FIG. 2). In the tapered coupling region 44, the core and cladding are elongated or "drawn" and hence have substantially smaller diameters. Thus, the drawn core 11' in the coupling region of fiber 10 has a minimum diameter $d'_{11}$ (FIG. 3) substantially smaller than $d_{11}$, whereas the cladding 12' in the coupling region has a minimum diameter $d'_{12}$ substantially smaller than diameter $d_{12}$.

Second fiber 20 includes a core 21 surrounded by an inner cladding 22 which in turn is surrounded by an outer cladding 23. Second fiber 20 also includes a first end region 46, a second end region 48 and a tapered coupling region 50 disposed between end regions 46 and 48. In the end regions, fiber 20 has its normal, undeformed diameter and the core, inner cladding and outer cladding have exterior diameters $d_{21}$, $d_{22}$ and $d_{23}$, respectively. Here again, in the coupling region 50, the fiber has a reduced diameter. Thus, core 21' has a diameter $d'_{21}$ substantially smaller than the diameter $d_{21}$ of the core in the end region. The minimum diameter $d'_{22}$ of the inner cladding in the coupling region 50 is substantially smaller than the undeformed, end-region diameter $d_{22}$ of the inner cladding, whereas the minimum diameter $d'_{23}$ of the outer cladding is likewise smaller than $d_{23}$. The term "maximum draw ratio" as used in this disclosure refers to the ratio of the normal, undeformed diameter of a fiber component in the end region to the minimum diameter of the same fiber component in the coupling region of the fiber. Preferably, the maximum draw ratios of all components of fibers 10 and 20 are identical. Thus, $$d_{12}/d'_{12} = d_{22}/d'_{22} = \text{Maximum Draw Ratio} \quad (1)$$

Most preferably, the outermost diameters $d_{23}$ and $d_{21}$ of the two fibers in the end regions are equal to one another and equal to the outside diameter of a standard telecommunications fiber. The end-region diameter $d_{22}$ of the second-fiber inner cladding is, therefore, smaller than the end-region outer diameter $d_{12}$ of the first fiber cladding. Where both fibers have the same maximum draw ratio, this relationship is maintained in the coupling regions, i.e., $d'_{22} < d'_{12}$.

Figure 4:
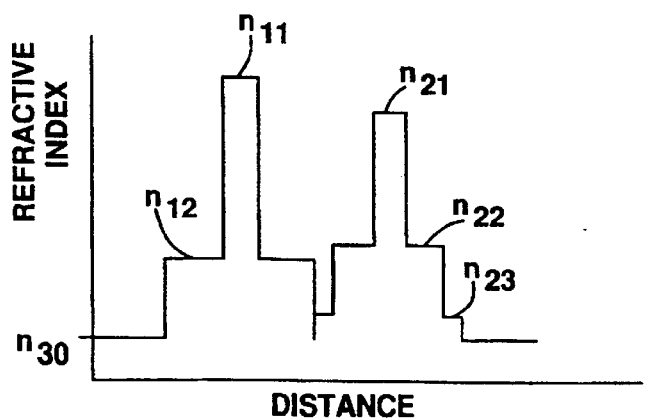
FIG. 4 is a diagram illustrating refractive indices of various components.

The fibers are disposed side-by-side, so that the coupling regions 44 and 50 extend side-by-side adjacent one another. The coupling regions are surrounded by an overcladding 30 such as air, glass or other material. The indices of refraction of the various components are shown in FIG. 4. Note that for this discussion, it is assumed that fibers 10 and 20 have step-type refractive index profiles. The refractive index $n_{12}$ of first-fiber cladding 12 is less than the index of $n_{11}$ of the first-fiber core, but greater than the refractive index $n_{30}$ of overcladding 30. Fiber 20 has a step-wise, monotonically decreasing refractive index distribution. Thus, the refractive index $n_{21}$ of the second fiber core is greater than the refractive index $n_{22}$ of the inner cladding, which in turn is greater than the refractive index $n_{23}$ of the outer cladding. Outer-cladding refractive index $n_{23}$ can be slightly greater than or equal to overcladding refractive index $n_{30}$. Preferably, both fibers, and the overcladding, are made entirely from glass such as silica-based glass, with conventional additives for modifying the indices of refraction of the various components. For example, the cores 11 and 21 may be formed from a silica-based glass doped with germanica. The claddings may include lesser amounts of germania and may also include fluorine or boron as a dopant which lowers the refractive index. Cladding 12 of the first fiber is preferably formed of pure $SiO_2$. As disclosed in U.S. Pat. No. 5,011,251, the disclosure of which is hereby incorporated by reference herein, $B_2O_3$ and/or fluorine are particularly useful dopants for lowering the refractive index of silica-based glass used as the overcladding. As discussed below, the diameters and refractive indices of the various components, as well as the draw ratio, are selected to provide the desired performance. However, for couplers intended to operate in the range of wavelengths from about 1200 to about 1600 nm, and intended to provide narrow band filtering action, typical parameters are as follows:

$d_{12}$ and $d_{23}$ equal about 125 μm (less commonly about 80 μm);

$d_{11}$ and $d_{21}$ equal about 2 μm to about 10 μm;

$d_{22}$ equals about 20 μm to about 100 μm;

$(n_{11}-n_{12})/n_{11}$ equals about 0.3% to about 2.0%;

$(n_{21}-n_{22})/n_{21}$ equals about 0.2% to about 2.0%;

$(n_{22}-n_{23})/n_{21}$ equals about 0.1% to about 0.6%;

$(n_{23}-n_{30})/n_{21}$ equals about 0 to about 0.6%.

If one of the refractive indices is known, the others can be determined. This should be clear from the later discussion of FIG. 13.

The end regions 40 and 42 form first and second ports of the coupler, at opposite ends of first fiber 10, whereas the end regions 46 and 48 form third and fourth ports respectively at opposite ends of second fiber 20. Light admitted through a port at one end of a fiber passes along the core of that fiber and into the coupling region waveguide constituted by the coupling region of such fiber and the overcladding. Each such waveguide includes the cladding(s) of the fiber and overcladding 30. For example, light admitted through first port 40 passes through core 11 and passes into the coupling region waveguide constituted by core 11', cladding 12' and the overcladding in the coupling region 44. Light passing along this waveguide can couple to the second waveguide constituted by core 21', claddings 22' and 23' and the overcladding 30 in the coupling region 44 and then pass from this waveguide into the core 21 of the second fiber and exit through port 48. Alternatively, light admitted through first port 40 may remain in the first coupling region waveguide and pass back into first core 11 and out of the coupler through the second port 42 at the opposite end of the first fiber. The degree to which light will be coupled into the second fiber depends upon the properties of the coupling region waveguides. Relationships for determining the degree of coupling between parallel waveguides in a surrounding medium are set forth, for example, Parriaux et al., "Wavelength-Selective Distributed Coupling Between Single Mode Optical Fibers for Multiplexing", *J. Optical Comun.* 2 (1981) 3, 105–109. Briefly, the degree of coupling depends strongly upon the difference between propagation constants for the light traveling along the two waveguides. The propagation constants for the two waveguides in turn are directly related to a parameter known as "effective refractive index" or $n_{eff}$ according to the relationship $$\beta = k_0 n_{eff} \quad (2)$$

where $k_0$, the free space propagation constant of light, is equal to $2\Pi/\lambda$, and $n_{eff}$ is the effective refractive index. The effective refractive index, in turn, depends upon a parameter referred to as a normalized frequency or V where:

$$V = 2\pi a/\lambda (n_i^2 - n_o^2)^{1/2} \quad (3)$$

where:
 a is the radius of the core in the waveguide;
 $n_i$ is the refractive index of the core in the waveguide;
 $\lambda$ is the wavelength of the light; and
 $n_o$ is the refractive index of the cladding or surrounding medium.

Figure 5:
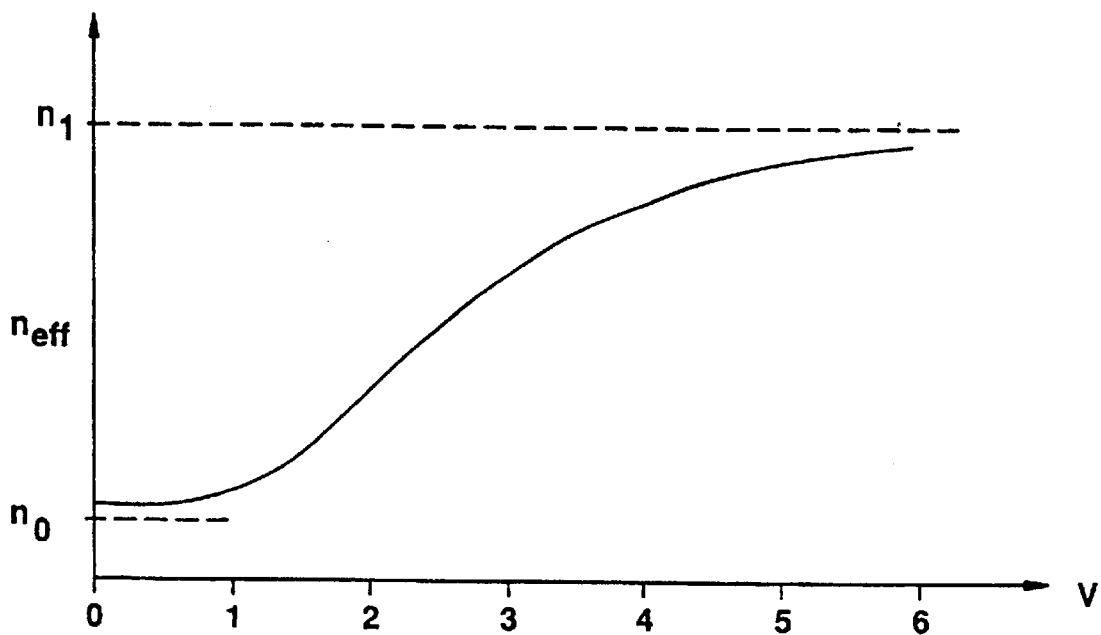
FIG. 5 is a graph depicting variation in fundamental mode effective index as a function of waveguide V-parameter.
Figure 6:
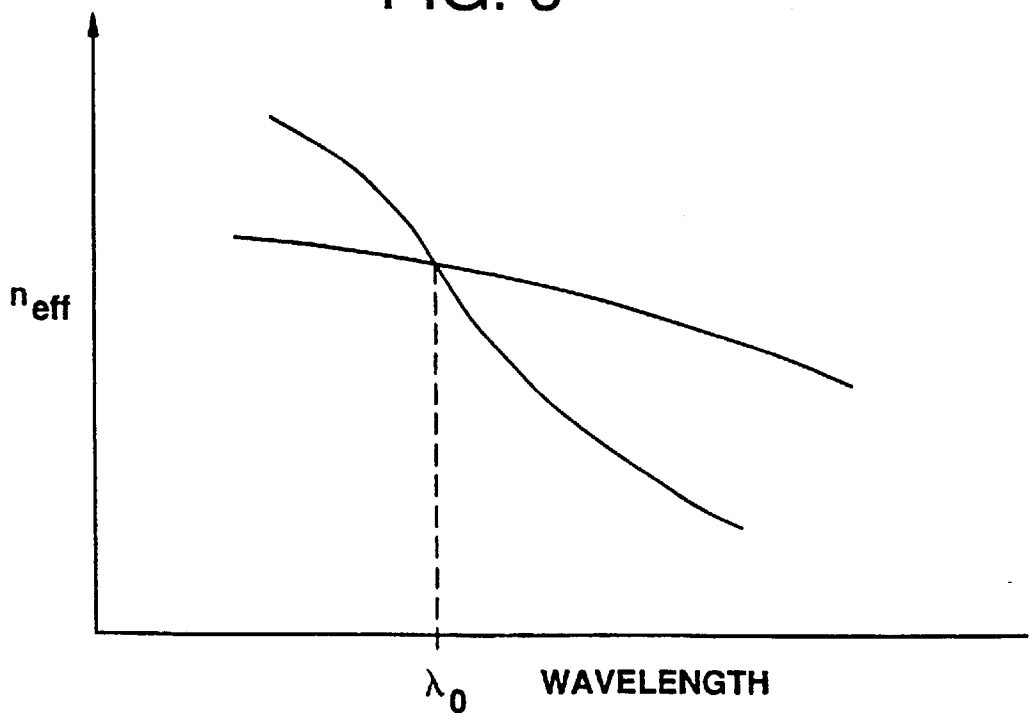
FIG. 6 is a graph illustrating variations in effective index with wavelength in the device of FIGS. 1–4.

The relationship between V and effective refractive index for single step-index fibers such as fiber 10 can be found with reference to well-known mode charts. One such mode chart appears in Keck, Optical Fiber Waveguides in Fundamentals of Optical Fiber Communications, Second Edition, Baronski, ed, New York, 1981, p. 18. The propagation constant $\beta$ may be calculated for an arbitrary waveguide using well-known techniques (see A. W. Snyder and J. D. Love, *Optical Waveauide Theory*, Chapman and Hall, New York, 1983). The relationships for propagation of light in the fundamental mode (the mode of importance with respect to single-mode optical fiber systems) are diagrammatically shown in FIG. 5. The effective refractive index $n_{eff}$ is approximately equal to the refractive index of the cladding $n_o$ for values of V less than about 1, and is about equal to the refractive index of the core $n_i$ for values of V greater than about 5. For the first waveguide 12' constituted by the coupling region of first fiber 10 and the overcladding 30, $n_i$ is approximately $n_{12}$, the refractive index of cladding 12, whereas $n_o$ is $n_{30}$, the refractive index of the overcladding. For the second waveguide 22' formed by the coupling region of the second fiber, $n_i$ is approximately $n_{22}$, whereas $n_o$ is approximately $n_{30}$. Thus, $n_{eff}$ varies over a wider range for the second waveguide 22' than for the first waveguide 12'. Also, because the diameter of waveguide 22' is smaller than the diameter of waveguide 12', the value of a in equation (3) is lower for waveguide 22' than for waveguide 12'. The net effect of these differences is that variation in the value of V from below about 1 to above about 5 occurs over a different range of wavelengths for waveguide 22' than for waveguide 12'. As depicted in FIG. 6, the curves of $n_{eff}$ and hence $\beta$ cross one another at a particular wavelength $\lambda_0$. For any given combination of parameters, such as the diameters and refractive indices of the waveguides, $\lambda_0$ can be determined by computing V over a range of $\lambda$ for each waveguide, determining me value of $n_{eff}$ for each waveguide at each $\lambda$ using the above-mentioned calculational techniques and plotting curves of $n_{eff}$ versus $\lambda$ for each waveguide to find the crossing point. This process can be repeated alternatively for various combinations of parameters until an appropriate value of $\lambda_0$ is found.

At values of $\lambda$ markedly different from $\lambda_0$, essentially no light is coupled from waveguide 12 to second waveguide 22, and essentially all of the light passing into fiber 12 through first port 40 exits through second port 42. For values of $\lambda$ in the vicinity of $\lambda_0$, the action of the coupler can be described by coupled mode theory as set forth in the aforementioned '251 patent and in the aforementioned A. W. Snyder and J. D. Love treatise. In accordance with this theory, the mode field of the overclad coupler is assumed to be a linear combination of the fundamental modes $\psi_1$ and $\psi_2$ of each of the waveguides 12' and 22' in the absence of the other waveguide, i.e. with the waveguide surrounded by overcladding of refractive index $n_{30}$ only. The mode fields and propagation constants can be determined exactly for such a structure. [M. J. Adams, An Introduction to Optical Waveguides].

The coupling constant C which describes the optical coupling between the two waveguides can then be written as an overlap integral:

$$C = \int \psi_1(r)\psi_2(r')(n-n')dA \quad (4)$$

In this equation, $\psi_1$ and $\psi_2$ are the mode fields of the two waveguides (each calculated with the other waveguide replaced by overcladding), r and r' are the radial distances from the center of the cores of waveguides, respectively, n is the refractive index structure of the entire coupler, n' is the refractive index structure with waveguide 22 replaced by overcladding material of refractive index $n_{30}$, and the integral is over the entire cross-section of the coupler (but n–n' is only non-zero over the waveguide 12'). The mode fields are assumed to be normalized in this equation, i.e., the integrals $\int \psi_1^2 dA$ and $\int \psi_2^2 dA$ both equal 1.

While these are tapered devices, their behavior is approximately modeled by assuming a constant draw ratio, equal to the maximum draw ratio over a given coupling length z with no coupling outside this length. This approximation works well since the coupling constant is a rapidly increasing function of draw ratio, and thus the behavior of a coupler is dominated by the behavior at the highest draw ratio. Using this approximation the distribution of power entering through first port 40 between the first and second fibers is given by $$P_{10}=1-F^2\sin^2(Cz/F) \quad (5)$$

and $$P_{20}=F^2\sin^2(Cz/F) \quad (6)$$

where the factor F is given by $$F=[1+(\beta_{12'}-\beta_{22'})/2C)^2]^{1/2} \quad (7)$$

In the above formulas $\beta_{12'}$ and $\beta_{22'}$ are the propagation constants of waveguides 12' and 22', respectively. $P_{10}$ is the proportion of power input to the first fiber 10 at port 40 which remains in fiber 10 and exits through port 42. $P_{20}$ is the proportion of the power input at port 40 which is transferred to fiber 20 and exits through port 48. Preferably, the coupling length z is selected so that $P_{20}$ is at a maximum at the operating wavelength $\lambda_0$, where $\beta_{12'}=\beta_{22'}$. The tapered coupler can be numerically modelled to provide a more complete description of its operation.

Figure 7:
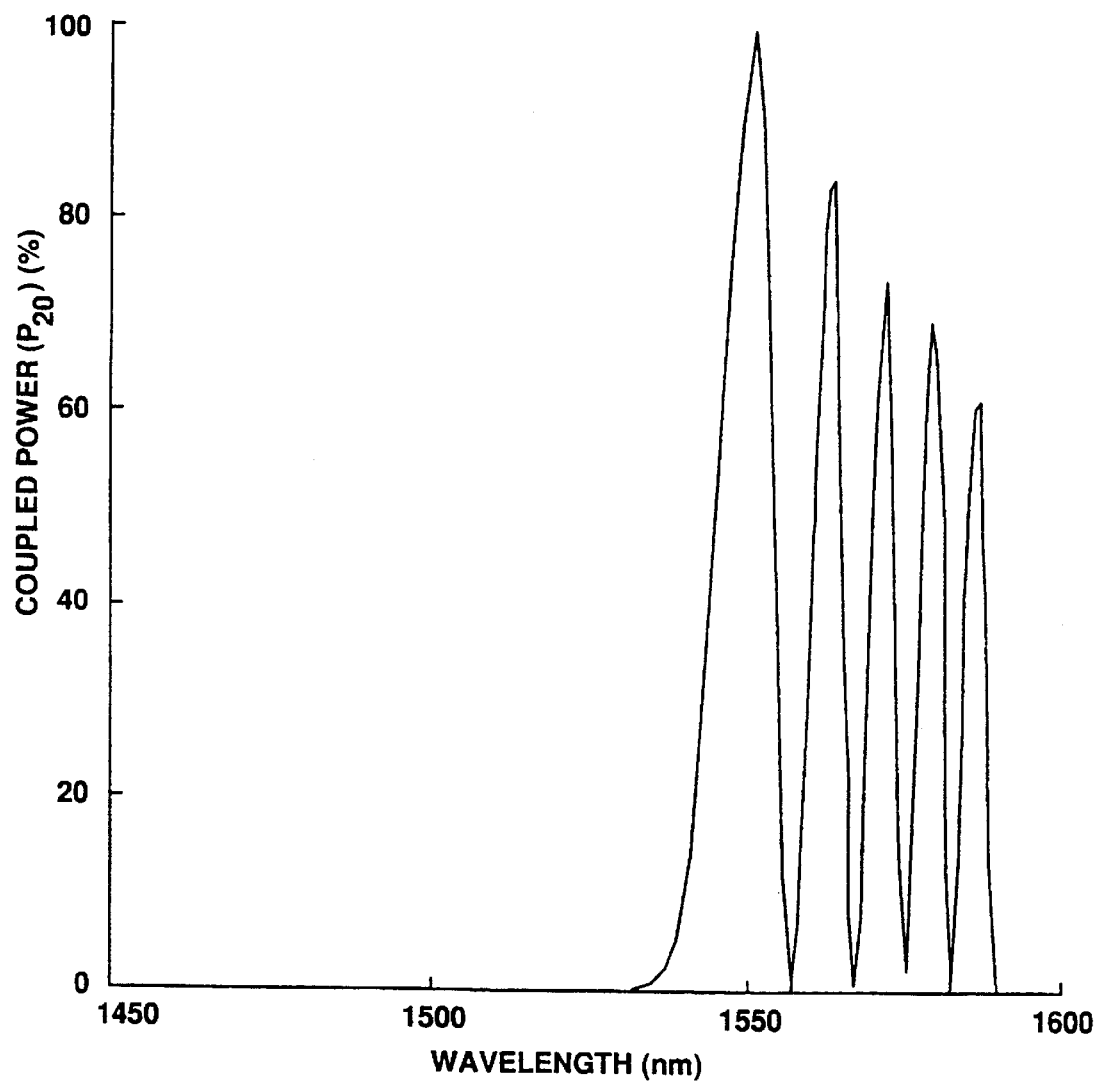
FIG. 7 is a graph of coupling ratio versus wavelength depicting theoretical performance of a device in accordance with one embodiment of the invention.

FIG. 7 depicts a typical numerically computed response curve for one narrow band filtering coupler in accordance with the invention. At $\lambda_0$, in this case about 1550 nm, $P_{20}$ is approximately 1.0 or 100%, i.e., essentially all of the light entering port 40 is transferred to the second fiber and passes out through port 48. The output from port 48 drops off rapidly at wavelengths different from $\lambda_0$. The coupler thus passes only wavelengths within a narrow pass band centered at $\lambda_0$ to port 48, and routes other wavelengths to port 42. The high wavelength oscillations (at wavelengths longer than $\lambda_0$) come from changes in $\lambda_0$ due to the taper of the modeled device.

Figure 8:
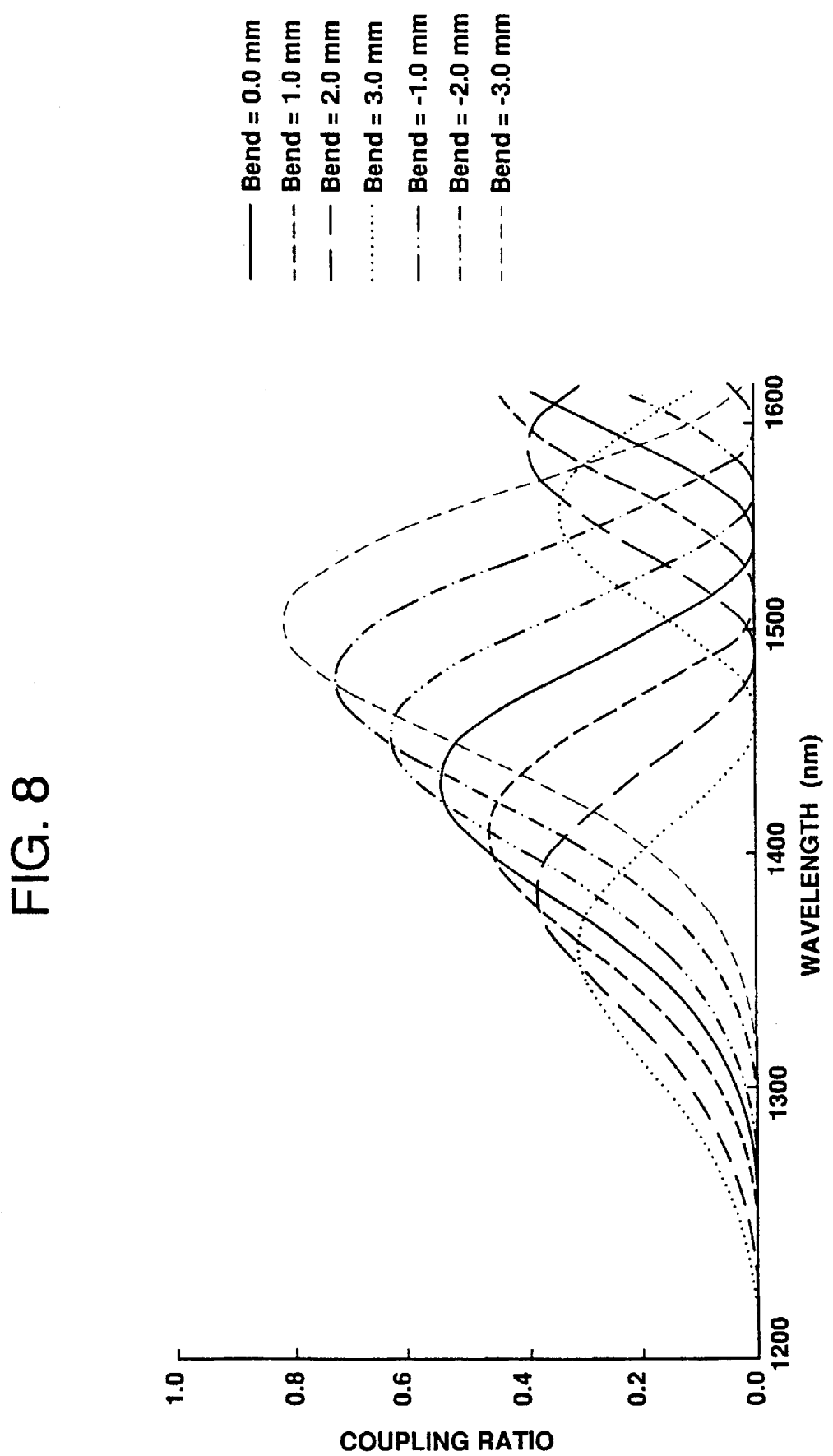
FIG. 8 is a set of further graphs depicting performance of a coupler in accordance with a further embodiment of the invention under conditions involving bending.
Figure 9:
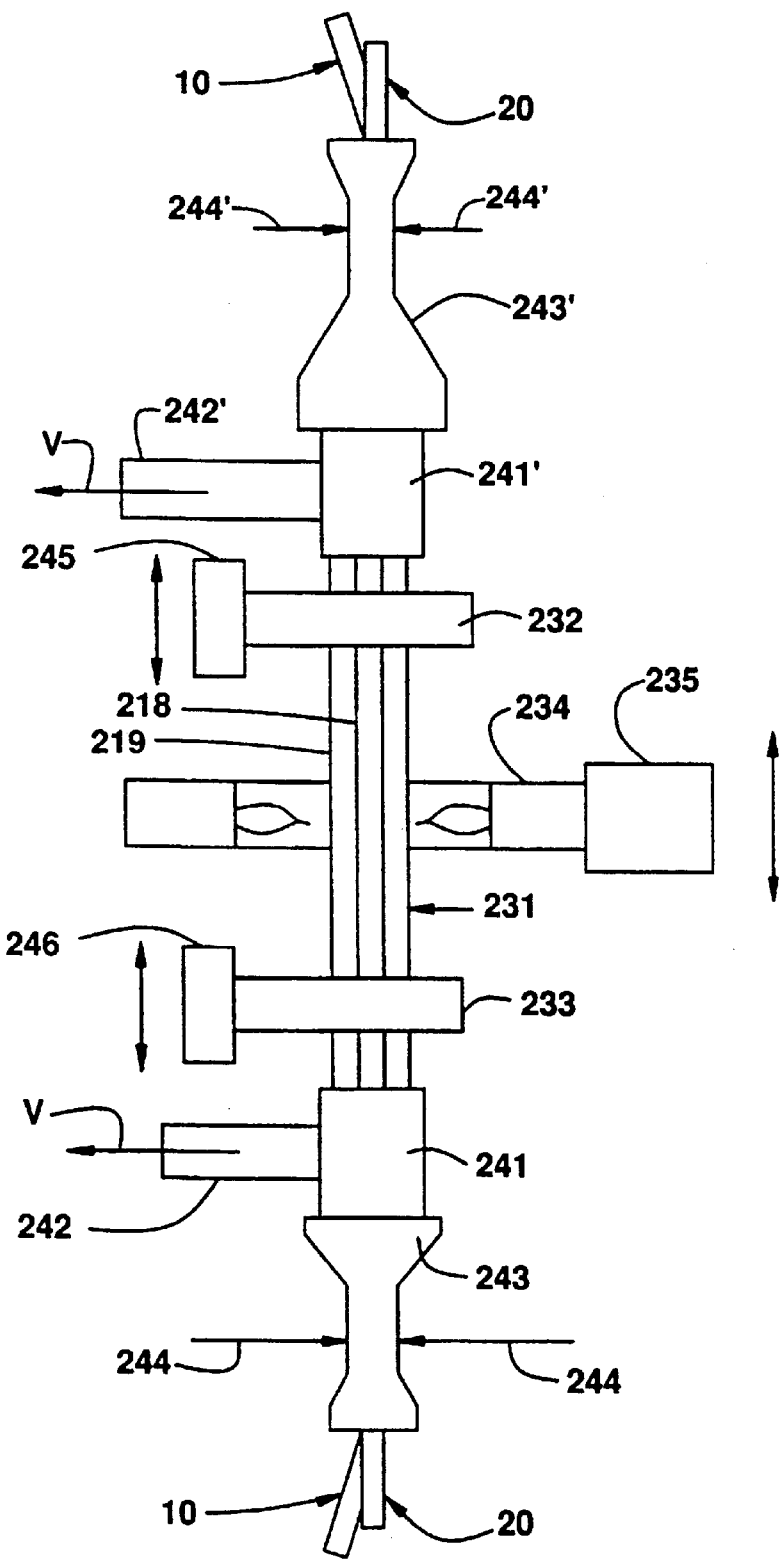
FIG. 9 is a diagrammatic elevational view of apparatus used in fabrication of couplers.

The characteristics of the coupler can be altered by bending the overcladding and the waveguides defined by the coupling regions transversely, in the plane of the side by side coupling regions. Thus, as illustrated in FIG. 1, the coupler can be bent in the plane corresponding to the plane of the drawing, to position 32 or to position 34. Bending in opposite directions shifts the pass band in opposite directions. Thus bending in the direction towards position 34, denoted by a positive bend radius in FIG. 8, shifts the peak coupling wavelength of the device, and hence the pass band for coupling light into the second fiber, to shorter wavelengths. Bending in the opposite direction, denoted by a negative bend radius in FIG. 8, shifts the pass band for light coupled to the second fiber to a higher wavelength. Thus, the coupler is tunable. Devices according to the foregoing embodiments can be fabricated by the procedures disclosed in U.S. Pat. Nos. 4,799,949, 5,011,251, and 5,295,211, the disclosures of which are hereby incorporated herein by reference. Preferably, the device is formed by inserting first fiber 10 and second fiber 20 (with any polymeric coatings removed) into the bore 218 of a tube of overcladding glass 219 to form a coupler preform 231 (FIG. 9). The bore can be provided with funnels (not shown) at each end to facilitate insertion of the fibers. Preform 231 is inserted through ring burner 234 and is clamped to draw chucks 232 and 233 which are mounted on motor controlled stages 245 and 246. The fibers are threaded through the vacuum attachments 241 and 241' which are then sealed to the ends of preform 231. Typical vacuum attachments are disclosed in the aforementioned U.S. Pat. No. 5,011,251. Vacuum is supplied to tube 241 through line 242. One end of a length of thin rubber tubing 243 is attached to that end of vacuum attachment 241 opposite preform 231; the remaining end of the tubing extending within tube clamping means (not shown). Upper vacuum attachment 241' is similarly associated with line 242', tubing 243' and tube clamping means. Portions of the fibers extend from tubing 243 and 243'. When air pressure is directed against tubing 243 and 243' as indicated by arrows 244, 244', to clamp the tubing against the fibers extending therethrough the bore of the overcladding tube evacuated through lines 242 and 242'.

After the preform is affixed to chucks 232 and 233 and the tube bore is evacuated, the tube is heated near one end to cause its midregion to collapse onto the fibers.

Thereafter, the coupler is formed by heating a region of the tube and moving computer controlled stages 245 and 246 in opposite directions to stretch the heated region. As the heated region is stretched, those portions of the fibers disposed in the heated region stretch along with the overcladding tube, thereby forming coupling regions 44 and 50 (FIG. 1). The tube stretching operation can be performed in accordance with U.S. Pat. No. 5,011,251.

While stretching the tube to form the coupler, optical power can be coupled to an input optical fiber, and the output signals can be monitored to control process steps in the coupler manufacturing process. Alternatively, trial devices can be fabricated using trial stretching distances within this stage, and the optimum stretching distance can be determined by measuring. In previous experience with overclad fiber optic couplers, the total stretching distance for both stages during the formation of each coupler was usually between 10 and 30 mm.

Because both fibers have end regions with outside diameter and core diameters equal those of standard optical fibers, the coupler can be connected readily into a standard optical fiber systems. Although the coupler is illustrated in FIG. 1 with all four ports 40, 42, 46 and 48 in condition for connection to fibers, many applications require only three ports; one port is unused. To minimize unwanted reflections from the unused port, the unused port may be provided with low reflectance termination as taught in U.S. Pat. No. 4,979,972. Briefly, the unused fiber end is heated and pulled to sever it and then further heated to cause the glass to form a bowl-like wand at its endface having a diameter equal to or slightly smaller than the original outside diameter.

The following specific example describes a method of making a fiber optic coupler in accordance with the invention.

The coupler fibers can be made by the process disclosed in U.S. Pat. Nos. 4,486,212 and 5,295,211 (which are incorporated herein by reference). The fibers had an outside diameter of 125 $\mu$m and were coated with urethane acrylate.

Fiber 10 was a step-index, single-mode telecommunications type optical fiber having a core of $SiO_2$ doped with 8.5 wt. % $GeO_2$ and a $SiO_2$ cladding.

Figure 13:
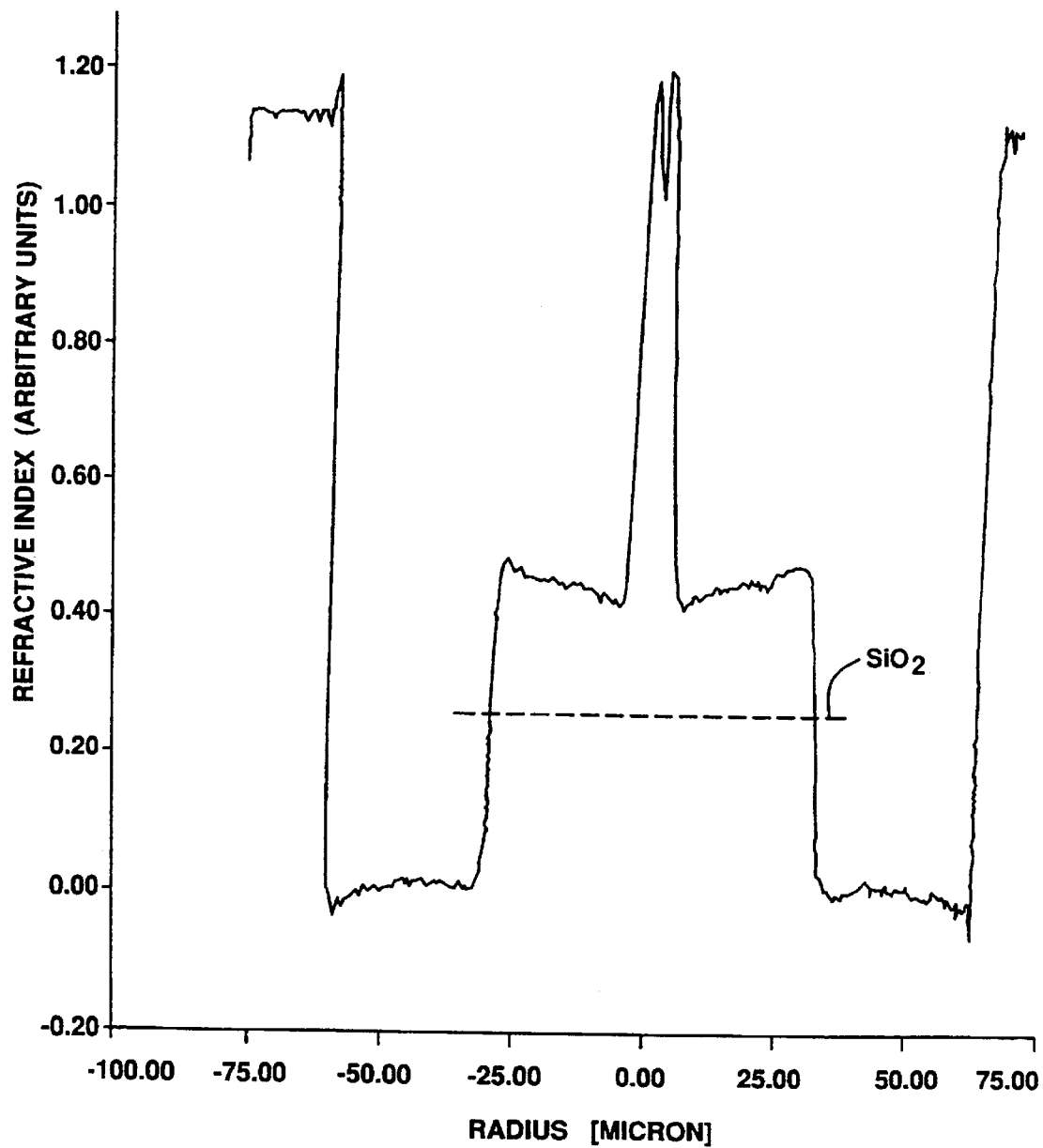
FIG. 13 is a refractive index profile of an optical fiber utilized in a specific example.

The refractive index profile of fiber 20 is illustrated in FIG. 13. Fiber 20 was a three-layer fiber having a core 21 of $SiO_2$ doped with about 18 wt. % $GeO_2$, an inner cladding 22 of $SiO_2$ doped with about 3 wt. % $GeO_2$ and a cladding of $SiO_2$ doped with about 1 wt. % fluorine. The dimensions and refractive index relationships of the two fibers are as follows:

$d_{12}$ and $d_{23}$ equal about 125 $\mu$m
$d_{11}$ equals about 8.3 $\mu$m;
$d_{21}$ equals about 10 $\mu$m;
$d_{22}$ equals about 31 $\mu$m;
$(n_{11}-n_{12})/n_{11}$ equals about 0.36%;
$(n_{21}-n_{22})/n_{21}$ equals about 0.75%;
$(n_{22}-n_{23})/n_{22}$ equals about 0.45%;

$(n_{23}-n_{30})/n_{23}$ equals about 0.05%;

$(n_{22}-n_{12})/n_{12}$ equals about 0.19%.

The refractive index $n_{12}$ of the pure $SiO_2$ cladding of fiber 10 is about 1.458.

Glass capillary tube 30 had a 3.8 cm length and an outside diameter of 2.8 mm. The bore was diamond shaped, each side of the diamond having a length of about 310 μm. The capillary tube was comprised of silica doped with 8.0 wt. % $B_2O_3$. A funnel (not shown) was formed at each end of the tube to facilitate the fiber insertion process.

A section of coating about 2.8 cm long was removed from the central region of one fiber to form a "center-stripped" fiber. A 6 cm long section of coating was removed from the end of the other fiber to form an "end-stripped" fiber. An antireflection termination was formed on the end of the end-stripped fiber by directing a flame at the center of the stripped region while the end of the fiber was pulled and severed to form a tapered end. The tip of the fiber was heated by a burner flame to cause the glass to recede and form a rounded endface. The resultant stripped end region was about 3.2 cm long.

The center-stripped fiber was threaded through the bore until the uncoated portion was disposed intermediate the ends of the tube. The end-stripped fiber was threaded into the bore until its coated portion was disposed within the funnel.

The resultant coupler preform 231 was formed into a coupler in the apparatus of FIG. 9 in the manner described above. During the tube stretching process, chucks 232 and 232' moved in opposite directions to provide a total increase in coupler length of about 3 cm as compared to original length of the capillary tube.

After the coupler had cooled, the vacuum lines were removed from the coupler, and a drop of adhesive was applied to each end of the capillary tube and was cured by exposure to UV light. The coupler was then removed from the draw.

Figure 14:
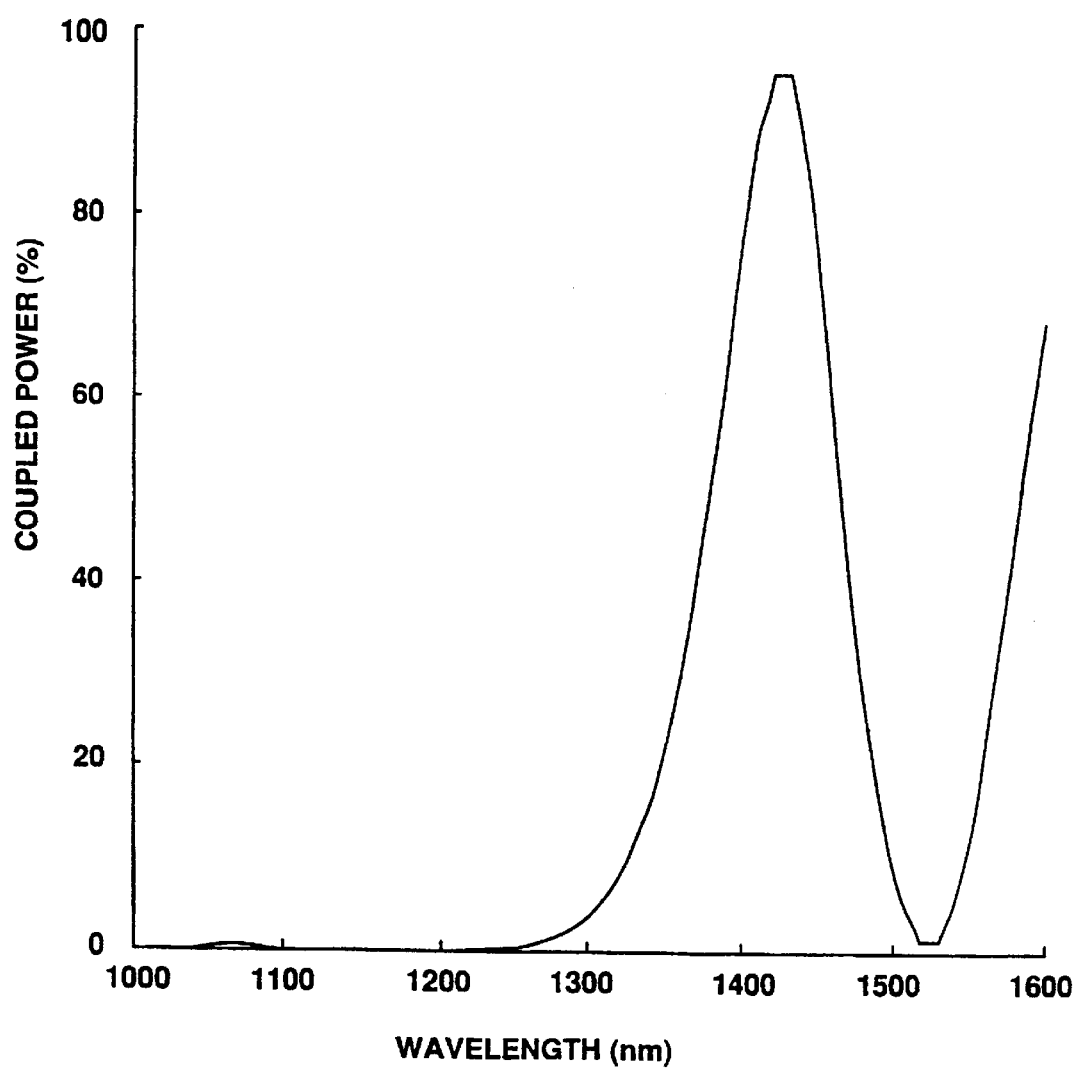
FIG. 14 is a graph of coupled power versus wavelength for the coupler of the example.

The graph of coupled power versus wavelength for the coupler formed in accordance with this example is shown in FIG. 14.

Figure 10:
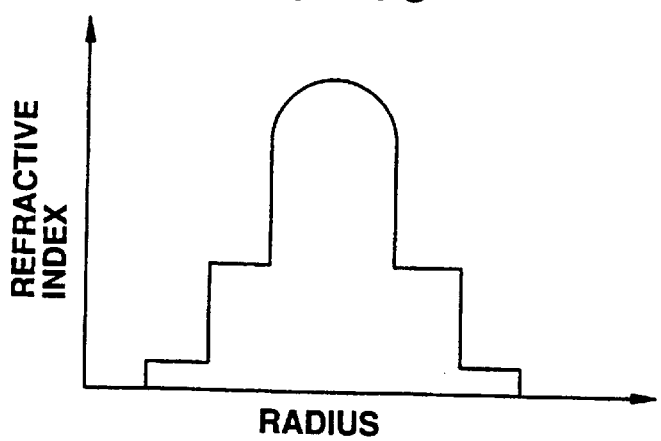
FIGS. 10–12 illustrate further additional refractive index profiles.
Figure 11:
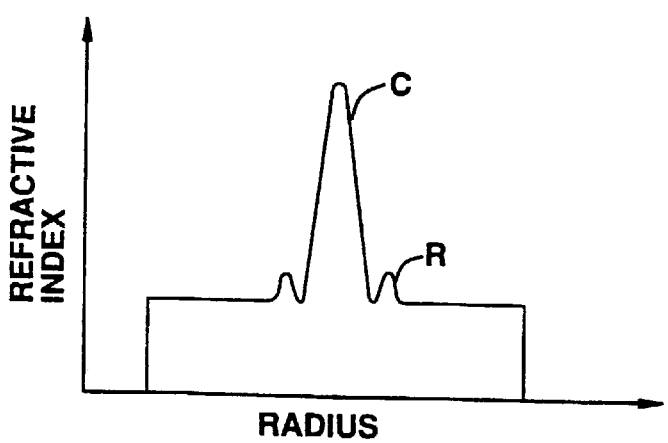

Numerous variations and combinations of the features discussed above can be utilized without departing from the present invention. For example, the second fiber can have more than two cladding layers and the first fiber can have more than one cladding layer. Moreover, although the fibers utilized in the previously described embodiments discussed above are step-index fibers, the invention can also be applied to gradient-index fibers. Thus, the cores of the fibers can have refractive indices which decrease progressively with increasing distance from the center of the core. FIG. 10 shows a three-layer fiber having a graded index core, and FIG. 11 shows a two-layer core having a graded index core. The index profile of FIG. 11 illustrates a typical, commercially available dispersion shifted fiber exhibiting zero dispersion at 1550 nm. The fiber core comprises a central core region 20 that is separated from an outer ring 21 by a region 22 of depressed refractive index. The diameter of the central triangular region C of the core is about 7.20 μm, and the inner diameter of ring R of the core is about 10.08 μm. The outer diameter of ring R (and thus the fiber core diameter.) is about 12.94 μm. The peak refractive index values of regions C and R (expressed as $\Delta_p$) are 0.9% and 0.3%, respectively. The term $\Delta_p$ is the relative refractive index of the core with respect to that of the cladding and is given by $$\Delta_p = (n_1^2 - n_2^2)/2n_1^2.$$

Figure 12:
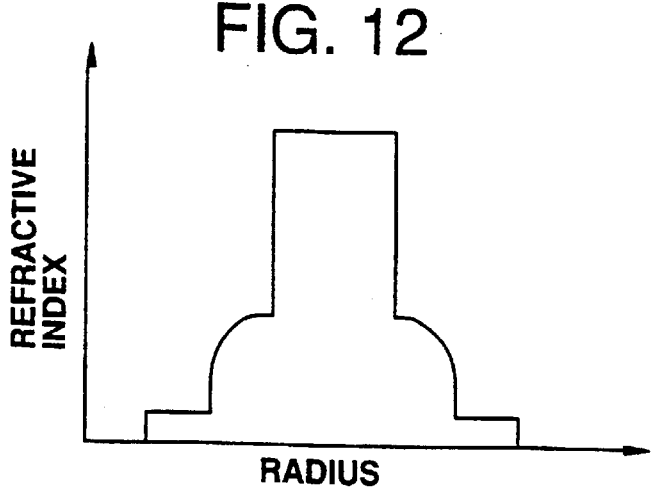

Portions of the fibers other than the cores can have graded index profiles. In FIG. 12, the refractive index profile of the inner cladding is graded.

Also, the invention can be applied to "M×N" couplers, wherein M is 1 or more and N is 2 or more. Light is coupled between one or more input fibers and two or more output fibers simultaneously, or from several input fibers to one or more output fibers simultaneously. As described, for example, in U.S. Pat. No. 5,351,325, such couplers may include a plurality of peripheral fibers surrounding a single central fiber. One or more of the peripheral fibers, or the central fiber, may be a multilayer fiber, so that the peripheral fiber defines a different refractive index distribution than the central fiber. Couplers in accordance with the present invention can be incorporated in interferometric devices such as Mach-Zehnder interferometers. A Mach-Zehnder interferometer incorporates two couplers connected by a plurality of light paths having different optical path lengths, i.e., fibers of different propagation constants, different physical lengths, or both. Light entering one coupler is split between the paths and recombined at the other coupler. As described, for example, in U.S. Pat. No. 5,295,205, a Mach-Zehnder interferometer can be fabricated using a single, integral glass tube to form the overcladdings of two spaced-apart tapered overclad couplers and also to form a housing enclosing the fibers connecting the couplers.

What is claimed is:

1. A fiber optic coupler comprising at least first and second fibers, (a) said first fiber having a first-fiber core of maximum refractive index $n_{11}$ and a first-fiber cladding of refractive index $n_{12}$ surrounding said core, said first fiber having end regions and a tapered coupling region disposed between said end regions, (b) said second fiber having a second-fiber core of maximum refractive index $n_{21}$, an inner cladding of refractive index $n_{22}$ surrounding said second-fiber core, and an outer cladding of refractive index $n_{23}$ surrounding said inner cladding, said second fiber having end regions and a tapered coupling region disposed between such end regions, said coupling regions of said first and second fibers extending side-by-side adjacent one another, and (c) a medium of refractive index $n_{30}$ surrounding said coupling regions of said fibers, wherein $n_{21} > n_{22} > n_{23}$;

$n_{23} \geq n_{30}$; and $n_{22} > n_{12} > n_{23}$.

2. A coupler as claimed in claim 1 wherein said tapered coupling region of said first fiber in said medium defines a first coupling region waveguide and said tapered coddling coupling region waveguide, and wherein the dispersion characteristic of the first coupling region waveguide relating the propagation constant $\beta_{12'}$ of light passing through the first coupling region waveguide to wavelength λ is different than the dispersion characteristic of the second coupling region waveguide relating the propagation constant $\beta_{22'}$ of the second coupling region waveguide to λ.

3. A coupler as claimed in claim 2 wherein the dispersion characteristics of said coupling region waveguides are selected so that $\beta_{12'} = \beta_{22'}$ only at an operating wavelength $\lambda_0$.

4. A coupler as claimed in claim 3 wherein said dispersion characteristics said coupling region waveguides are selected so that for $\lambda < \lambda_0$, $\beta_{12'} > \beta_{22'}$; and so that for $\lambda > \lambda_0$, $\beta_{12'} < \beta_{22'}$.

5. A coupler as claimed in claim 1 wherein the diameter of said inner cladding of said second fiber in said second fiber coupling region is $d_{22'}$ and the diameter of said first-fiber cladding in said first fiber coupling region is $d_{12'}$, and wherein $d_{22'} < d_{12''}$.

6. A coupler as claimed in claim 1 wherein said cladding of said first fiber has an end-region diameter $d_{12}$ in the end regions thereof, said outer cladding of said second fiber has an end-region diameter $d_{23}$ in the end regions of said second fiber and wherein $d_{12}$ is substantially equal to $d_{23}$.

7. A coupler as claimed in claim 6 wherein said tapered coupling region and said end region of said first fiber have a first draw ratio and said second tapered coupling region and said end region of said second fiber have a draw ratio equal to said first draw ratio.

8. A coupler as claimed in claim 6 wherein said first-fiber core has an end-region diameter $d_{11}$ in the end regions thereof, said core of said second fiber has an end-region diameter $d_{21}$ in the end regions of said second fiber, and wherein $d_{11}$ is substantially equal to $d_{21}$.

9. A coupler as claimed in claim 8 wherein $n_{11}$ is substantially equal to $n_{21}$.

10. A coupler as claimed in claim 1 wherein $n_{23} > n_{30}$.

11. A coupler as claimed in claim 1 wherein said surrounding medium of refractive index $n_{30}$ is glass.

12. A coupler as claimed in claim 1 wherein said surrounding medium of refractive index $n_{30}$ is air.

13. A coupler as claimed in claim 1 further comprising means for bending said first and second fibers.

14. A coupler as claimed in claim 1 wherein said at least first and second fibers comprise N fibers wherein N>2, at least one of said fibers having the refractive index characteristics of said second fiber.

15. A coupler as claimed in claim 14 wherein said coupler comprises a plurality of fibers surrounding one fiber.

16. A coupler as claimed in claim 1 wherein said first and second fibers have two tapered coupling regions, whereby said coupler functions as an interferometer.

17. An overclad coupler having at least first and second fibers, each said fiber having a pair of end regions and at least one tapered coupling region disposed between said end regions, said coupling regions extending side-by-side adjacent one another, said coupler further including an overcladding surrounding said coupling regions, said first and second fibers having the same outside diameter in said end regions, said first and second fibers each having a core and one or more claddings, said one or more claddings of each said fiber having a monotonic decreasing refractive index distribution, said refractive index distributions of said claddings being different from one another, said tapered coupling regions of fibers forming first and second waveguides, the dispersion characteristic of the first waveguide relating the propagation constant $\beta_{12'}$ of light passing through the first waveguide to wavelength $\lambda$ being different than the dispersion characteristic of the second waveguide relating the propagation constant $\beta_{22'}$ of the second waveguide to $\lambda$, the dispersion characteristics of said waveguides being selected so that $\beta_{12'} = \beta_{22'}$ only at an operating wavelength $\lambda_0$.

18. A coupler as claimed in claim 17 wherein, in said end regions, the cores of said first and second fibers have substantially the same diameter.

19. A coupler as claimed in claim 17 wherein said dispersion characteristics are selected so that for $\lambda < \lambda_0$, $\beta_{12'} > \beta_{22'}$; and so that for $\lambda > \lambda_0$, $\beta_{12'} < \beta_{22'}$.

* * * * *